United States Patent Office 3,772,260
Patented Nov. 13, 1973

3,772,260
HIGH MOLECULAR WEIGHT SUBSTITUTED (CO) POLYALKAMERS AND PROCESS FOR PREPARING SAME
Gino Dall'Asta, San Giuliano Milanese, Pietro Meneghini, Pioltello, and Ugo Gennaro, Milan, Italy, assignors to Montecatini Edison S.p.A., Milan, Italy
No Drawing. Filed Oct. 14, 1971, Ser. No. 189,341
Claims priority, application Italy, Oct. 17, 1970, 31,097/70
Int. Cl. C08f 7/00
U.S. Cl. 260—88.2 F
7 Claims

ABSTRACT OF THE DISCLOSURE

New products are disclosed which are substituted (co) polyalkamers of high molecular weight and the macromolecules of which consist essentially of the same or different repeating units and are characterized in exhibiting a main linear saturated hydrocarbon chain having two side substituents linked to adjacent carbon atoms. One of the substituents is a chlorine atom; the other is an ester group.

The new substituted (co) polyalkamers are prepared by reacting a polyalkenamer made up of the same or different units, dissolved in methylene chloride, alone or mixed with methanol or benzene, with (a) an organic monobasic acid containing from 1 to 18 carbon atoms and having a dissociation constant in water at 25° C. of at least $1.65 \times 10^{-5}$, and (b) an alkyl hypochlorite.

The substituted co (polyalkamers) of this invention have the following formula:

(I)    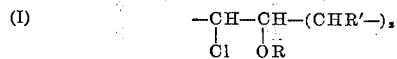

in which R is a radical containing from 1 to 18 carbon atoms of an organic monobasic acid having a dissociation constant in water at 25° C. of at least $1.65 \times 10^{-5}$; the R' groups are hydrogen atoms or a part of them are methyl groups; z is a whole number from 3 to 10; and the ratio between the methylene groups and the sum of the CHCl and CHOR groups is comprised between 1.5:1 and 5:1.

THE PRIOR ART

High polymers containing a main saturated hydrocarbon chain having substituents consisting of chlorine and of an ester group are known in the art. The most widely known among such polymers are the copolymers of vinyl chloride with vinyl esters, such as vinyl acetate. However, such copolymers are quite different from the polymers of this invention, in that:

(1) In the known copolymers the chlorine and ester group substituents are not linked to two adjacent carbon atoms of the main chain and in fact said known copolymers are characterized by structures of the type (II)    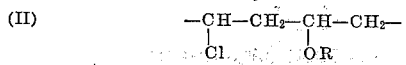

that is, a $CH_2$ group is always present between the CHCl and the CHOR groups;

(2) In the polymers of the present invention every CHCl group is adjacent to and directly linked to a CHOR group in order to have, always, a 1:1 ratio between the two substituents both in the polymer as a whole and in each repeating unit, whereas in the known copolymers of vinyl chloride and vinyl esters said ratio always varies according to the amounts of the two monomers employed in the copolymerization and, also, in the case of a copolymer consisting for 50% of vinyl chloride and for 50% of vinyl ester, there are always more or less long sequences of units of a single type and, consequently, no local 1:1 ratio between the CHCl and CHOR groups; and (3) In the known copolymers of vinyl chloride with vinyl esters, the ratio between methylene groups and CHX groups (CHX being the sum of CHCl+CHOR) is always 1:1, whereas in the substituted (co) polyalkamers of this invention such ratio can be optionally varied between 1.5:1 and 5:1.

The differences in structure between the present substituted (co) polyalkamers and the known vinyl chloride/vinyl ester copolymers are important because the present products have new and unexpected properties which are not obtainable with the vinyl chloride/vinyl ester copolymers.

For instance, by varying the value of z in Formula I for the products of this invention it is possible to vary, over a wide range, both the solubility and the transition temperature of our new polymers and copolymers. That is to say, by varying the ratio between the hydrocarbon sequence and the functional groups (CHCl+CHOR) in our products, we achieve new and unexpected properties of particular interest and utility in particular fields of application for our products.

Also, the fact that, in our (co) polymers, the CHCl and CHOR groups are linked directly to adjacent carbon atoms of the main chain permits of achieving particular properties, for instance by chemical reactions between the adjacent groups, which cannot be obtained in the case of the vinyl chloride/vinyl ester copolymers due to the larger distance between the Cl or OR groups.

A further possibility of varying at will the properties of the (co) polyalkamers of this invention consists in introducing methyl groups (R' in the repeating unit of Formula I) instead of hydrogen. Similar copolymers cannot be prepared by the copolymerization of monomers containing a methyl group in position beta with respect to a chlorine atom or to an acyloxy group bound to a double bond, since such a monomer (e.g., 1-chloro-2-methyl ethylene) has an inner olefinic unsaturation and does not tend to polymerize.

Also known in the literature are polymers containing CHCl and CHOR substituents (wherein R has the above stated significance) linked to adjacent carbon atoms of a same repeating unit. Such polymers are obtained by reaction of 1,4-polybutadiene with a mixture of an alkylpochlorite and an acid. Monomeric units of type III are thus obtained:

(III)    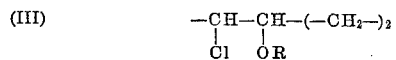

Since, according to the prior art (see, e.g., British Patent No. 1,097,746), the reaction is never complete in the case of 1,4-polybutadiene, the polymer thus obtained always contains, also, large amounts of the starting unit, namely of type IV:

(IV)    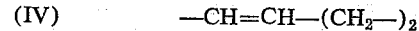

The presence of considerable amounts of units of type IV, and therefore of olefinic unsaturation, confers a considerable instability on the polymers obtained from 1,4-polybutadiene, which manifests itself in, for instance, undesirable crosslinkings, yellowing, etc. due to atmospheric agents, in particular oxygen and ozone.

Moreover, the polymers obtained starting with 1,4-polybutadiene differ from the co (polyalkamers) of this invention in that in the former the ratio between the methylene groups and the functional groups (CHCl +CHOR) is always 1:1 and does not vary between 1.5:1 and 5:1 as it can in the present products.

THE PRESENT INVENTION

One object of this invention was to provide new substituted co (polyalkamers) which differ structurally from both the known vinyl chloride/vinyl ester copolymers and the polymers obtainable by reacting 1,4-polybutadiene with a mixture of an alkylhypochlorite and an acid, and which are more versatile than either of those known products.

Another object was to provide a process for obtaining the new substituted (co) polyalkamers.

Still a further object was to provide new substituted co (polyalkamers) adopted to use in various areas of industry.

Other objects will appear from the detailed description of the invention which follows.

These objects have been accomplished by the present invention which provides the new substituted (co) polyalkamers consisting essentially of units of type I. The products are not only new in the art but the preparation thereof was not predictable on the basis of what was previously known in the art.

Surprisingly, we have found that it is possible to prepare high molecular weight hydrocarbon (co) polymers the macromolecules of which consist essentially of repeating units containing one or more structures I and therefore consisting essentially of a saturated polyhydrocarbon chain, and having particular, variable chemical-physical properties which adopt them to particular applications. In practice, the main chain may contain a small percentage of unsaturation without any considerable modification of the properties of the product.

Also surprisingly, in the state of the art, and as will appear more clearly hereinafter, it has been found possible, by varying the parameters R, R' and Z in Formula I, to enhance, or to modify, the chemical-physical properties of our products according to specific needs, and thus obtain products which are best adapted to a particular use.

(Co) polyalkamers consisting essentially of repeating units of type I which can be advantageously prepared by the method described herein are those in which z is 3, 4, 5, 6, 8 or 10 and all R' groups are hydrogen; or those in which z is 3, 4, 5, 6, 8 or 10 and one, two or three of the R' groups consist of methyl while the remaining R' groups in the repeating unit are hydrogen. In these products, the R groups which, as defined herein, is the radical of a monobasic acid containing 1 to 18 carbon atoms and having a dissociation constant in water at 25° C. of at least $1.65 \times 10^{-5}$, may be, for instance, the radical of any of the following organic acids: formic, acetic, monochloro, acetic, dichloroacetic, trichloroacetic, monocholropropionic, trichlorobutyric, $\omega$-trichlorooctanoic, monofluoroacetic, difluoroacetic, trifluoroacetic, difluoromonochloroacetic, monobromoacetic, perfluorobutyric, perfluorooctanoic, phenylacetic, p-toluenesulphonic, benzenesulphonic, chlorobenzoic, lactic, o-nitrobenzoic, salicyclic acid, and thioglycolic acids.

Examples of the preferred are: formic acid, acetic acid, p-toluenesulphonic acid, trichloroacetic acid, trifluoroacetic acid, perfluorobutyric acid and perfluorooctanoic acid.

Preferred examples of polymers essentially consisting of repeating units I and obtainable according to the present invention are, therefore:

poly(1-chloro-2-formyloxy-pentamer;
poly(1-chloro-2-acetoxy-pentamer);
poly(1-chloro-2-trichloro-acetoxy-pentamer);
poly(1-chloro-2-trifluoro-acetoxy-pentamer);
poly(1-chloro-2-perfluorobutyryloxy-pentamer);
poly(1-chloro-2-perfluorooctanoyloxy-pentamer);
poly(1-chloro-2-p-toluenesulphonyloxy-pentamer);
poly(1-chloro-2-formyloxy-methylpentamer);
poly(1-chloro-2-acetoxy-methylpentamer);
poly(1-chloro-2-trichloroacetoxy-methylpentamer);
poly(1-chloro-2-perfluorobutyryloxy-methylpentamer);
poly(1-chloro-2-p-toluenesulphonyloxy-methylpentamer);
poly(1-chloro-2-formyloxy-hexamer);
poly(1-chloro-2-acetoxy-hexamer);
poly(1-chloro-2-trichloroacetoxy-hexamer);
poly(1-chloro-2-perfluorobutyryloxy-hexamer);
poly(1-chloro-2-p-toluenesulphonyloxy-hexamer);
poly(1-chloro-2-formyloxy-heptamer);
poly(1-chloro-2-acetoxy heptamer);
poly(1-chloro-2-trichloroacetoxy-heptamer);
poly(1-chloro-2-perfluorobutyryloxy-heptamer);
poly(1-chloro-2-p-toluenesulphonyloxy-heptamer);
poly(1-chloro-2-formyloxy-octamer);
poly(1-chloro-2-acetoxy-octamer);
poly(1-chloro-2-trichloroacetoxy-octamer);
poly(1-chloro-2-trifluoroacetoxy-octamer);
poly(1-chloro-2-perfluorobutyryloxy-octamer);
poly(1-chloro-2-perfluorooctanoyloxy-octamer);
poly(1-chloro-2-p-toluenesulphonyloxy-octamer);
poly(1-chloro-2-formyloxy-methyloctamer);
poly(1-chloro-2-acetoxy-methyloctamer);
poly(1-chloro-2-trichloroacetoxy-methyloctamer);
poly(1-chloro-2-trifluoroacetoxy-methyloctamer);
poly(1-chloro-2-p-toluenesulphonyloxy-methyloctamer);
poly(1-chloro-2-formyloxy-dimethyloctamer);
poly(1-chloro-2-acetoxy-dimethyloctamer);
poly(1-chloro-2-trichloroacetoxy-dimethyloctamer);
poly(1-chloro-2-trifluoroacetoxy-dimethyloctamer);
poly(1-chloro-2-p-toluenesulphonyloxy-dimethyloctamer);
poly(1-chloro-2-formyloxy-decamer);
poly(1-chloro-2-acetoxy-decamer);
poly(1-chloro-2-trichloroacetoxy-decamer);
poly(1-chloro-2-trifluoroacetoxy-decamer);
poly(1-chloro-2-perfluorobutyryloxy-decamer);
poly(1-chloro-2-p-toluenesulphonyloxy-decamer);
poly(1-chloro-2-formyloxy-dimethyldecamer);
poly(1-chloro-2-acetoxy-dimethyldecamer);
poly(1-chloro-2-trifluoroacetoxy-dimethyldecamer);
poly(1-chloro-2-formyloxy-dodecamer);
poly(1-chloro-2-acetoxy-dodecamer);
poly(1-chloro-2-trichloroacetoxy-dodecamer);
poly(1-chloro-2-trifluoroacetoxy-dodecamer);
poly(1-chloro-2-perfluorobutyryloxy-dodecamer);
poly(1-chloro-2-perfluorooctanoyloxy-dodecamer);
poly(1-chloro-2-p-toluenesulphonyloxy-dodecamer);
poly(1-chloro-2-formyloxy-pentamer);
poly(1-chloro-2-acetoxy-methyldodecamer);
poly(1-chloro-2-trifluoroacetoxy-methyldodecamer);
poly(1-chloro-2-p-toluenesulphonyloxy-methyldodecamer);
poly(1-chloro-2-formyloxy-trimethyldodecamer);
poly(1-chloro-2-acetoxy-trimethyldodecamer);
poly(1-chloro-2-perfluorobutyryloxy-trimethyldodecamer); and
poly(1-chloro-2-p-toluenesulphonyloxy-trimethyldodecamer);

The polymers according to the present invention also include the copolymers having the main chain essentially saturated and consisting of more than one type of units according to Formula I. Such copolymers can be obtained for instance from units wherein R and R' are the same. but wherein different Z values are simultaneously present in the same polymer; polymers whose units have essentially the same R and Z groups, but different R' values simultaneously present; polymers in which the values for R' and Z are constant but different R values are simultaneously present; and polymers in which the values for R, R' and Z are different in the units making up the chain.

Examples of polymers of these types include:

poly(1-chloro-2-acetoxy-pentamer)-co-(1-chloro-2-acetoxy-octamer);
poly(1-chloro-2-trifluoroacetoxy-pentamer)-co-(1-chloro-2-trifluororo-acetoxy-octamer);

poly(1-chloro-2-acetoxy-octamer)-co-(1-chloro-2-acetoxy-dodecamer);
poly(1-chloro-2-acetoxy-pentamer)co-(1-chloro-2-acetoxy-methylpentamer);
poly(1-chloro-2-trifluoroacetoxy-pentamer)-co-(1-chloro-2-trifluoroacetoxy-methylpentamer);
poly(1-chloro-2-acetoxy-pentamer)-co-(1-chloro-2-p-toluenesulphonyloxy-pentamer);
poly(1-chloro-2-acetoxy-octamer)-co-(1-chloro-2-trifluoroacetoxy-octamer);
poly(1-chloro-2-acetoxy-pentamer)-co-(1-chloro-2-p-toluenesulphonyloxy-methyloctamer).

The possibility of varying the properties of the present (co) polymers by varying the three variables R, R' and Z of the repeating units is illustrated for instance by the following comparisons. The glass transition temperatures in the homologous series:

poly(1-chloro-2-acetoxy-pentamer);
poly(1-chloro-2-acetoxy-octamer);
poly(1-chloro-2-acetoxy-dodecamer);

are respectively +7, −4 and 13° C.;

in the homologous series:

poly(1-chloro-2-perfluorobutyryloxy-pentamer);
poly(1-chloro-2-perfluorobutyryloxy-octamer);
poly(1-chloro-2-perfluorobutyryloxy-dodecamer)

the glass transition temperatures are respectively +14, −5 and −31° C., in this last series the polymers density varies respectively as follows: 1.52; 1.40; 1.27 g./cc. (at 23° C.). In the series poly(1-chloro-2-acetoxy-pentamer); poly(1-chloro - 2 - trifluoro - acetoxy - pentamer); poly(1-chloro - trichloroacetoxy - pentamer) the glass transition temperature variation is respectively as follows: +7; +48; +56° C.

The substituted (co)polyalkamers according to the present invention can find useful applications in several fields. Thus for example, owing to their solubility in various polar solvents, to their excellent film-forming properties and to their chemical stability to atmospheric agents, they can be employed for instance as film-forming agents for paints for inside and outside applications. The films obtained from the (co)polyalkamers are perfectly transparent and exhibit very good adhesion properties on the most different surfaces.

By total or partial saponification of the ester groups of the aforesaid polymers it is possible to obtain polymers containing hydroxy groups, capable of forming cross-linking bridges to transform the polymers into elastic rubbers or into ion exchange resins.

Some of the polymers according to the present invention, owing to their flexibility and favorable glass transition temperature, can be usefully employed in the field of plastic materials processable by press or extrusion molding.

Some other of these polymers, in particular some containing fluorine such of poly(1-chloro-2-perfluorobutyryloxy-pentamer),
poly(1-chloro-2-perfluorooctanoyloxy-pentamer) and
poly(1-chloro-2-perfluorooctanoyloxy-octamer)

are characterized by their hydrophobicity. Owing to this property, whose index is the critical surface tension, such polymers are very important as dressings for waterproof fabrics, as stain-proof agents for fabrics and as water-repellent agents for paints.

The process according to the present invention for preparing the above specified substituted (co)polyalkamers, whose macromolecules essentially consist of the same or different repeating units having one or more structures of type I, is characterized in that a polyalkenamer, made up of the same or different units having the following structure (V)        —CH=CH—(—CHR')$_z$ wherein R' and Z have the meaning defined hereinabove, dissolved in methylene chloride alone or admixed with methanol or benzene is made to react with:

(a) an organic monobasic acid containing 1 to 18 carbon atoms and having a dissociation constant in water at 25° C. of at least $1.65 \times 10^{-5}$, and
(b) an alkylhypochlorite.

The alkylhypochlorite preferably employed is a hypochlorite soluble in the above said organic solvents, such as for instance tert.butyl hypochlorite. Examples of the organic monobasic acids having the dissociation constant defined hereinbefore and employable in the process according to the present invention are the following organic acids: formic, acetic, monochloroacetic, dichloroacetic, trichloroacetic, monochloropropionic, trichlorobutyric, ω-trichlorooctanoic, monofluoroacetic, difluoroacetic, trifluoroacetic, difluoro-monochloroacetic, monobromoacetic, perfluorobutyric, perfluorooctanoic, phenylacetic, p-toluenesulphonic, benzenesulphonic, chlorobenzoic, lactic, o-nitrobenzoic, salicyclic, and thioglycolic acids.

Preferred examples of acids of this type are: formic acid, acetic acid, p-toluenesulphonic acid, trichloroacetic acid, trifluoroacetic acid, perfluorobutyric acid and perfluorooctanoic acid.

These acids are suitably employed in amounts of 1–2 moles, preferably of 1–1.3 moles, with respect to one mole of the polyalkenamer monomeric units, namely to one mole of double bonds of the starting polymer.

The conversion of the double bonds into

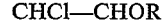

CHCl—CHOR groups is practically complete. Alkylhypochlorite is suitably employed in amounts of 1–1.3 moles, preferably of 1–1.1 moles with respect to one mole of polyalkenamer monomeric units, namely to one mole of double bonds of the starting polymer.

The polyalkenamers employed according to the present process can be suitably prepared for instance according to one of the following Italian patents: Nos. 678,656; 701,182; 733,857; 751,426; 773,657; 778,370; 784,307; 789,585 and 805,709; or according to any other process of the prior art. Therefore, it is possible to utilize either homopolyalkenamers obtained by homopolymerization of a cycloolefin, or copolyalkenamers obtained by copolymerization of more than one cycloolefin, or polyalkenamers having a regulated molecular weight, obtained by polymerization of one or more cycloolefins in the presence of molecular weight regulators such as, for example, conjugated dienes, alpha-olefins, inner olefins or water, or of modified polyalkenamers, obtained for example by post-treatment of a polyalkenamer with other unsaturated polymers, for instance polybutadienes, in the presence of a catalyst on the basis of tungsten compounds, or by post-treatment of a polyalkenamer with a catalyst modifying the steric structure of the polyalkenamer double bonds. Polyalkenamers of the above-said type may be employed in which all double bonds are essentially either of the trans-type, or essentially of the cis-type, or they may contain large amount of both types of double bonds.

The molecular weight of the polyalkenamer is not a limiting parameter. The polyalkenamer is suitablye made to react with the hypochlorite and the acid in dissolved form in an organic solvent, preferably in methylene chloride. Though the concentration of said solution is not a limiting parameter, still concentrations of polyalkenamers in methylene chloride at the ratio of 0.5–5% by weight of polymer per solvent volume are preferably used.

The acid is suitably mixed with the polyalkenamer solution either before adding the hypochlorite or at the same time, as the hypochlorite but not afterwards. The acid may be added as such or, especially when it is a solid acid, as a solution. Methylene chloride itself or mixtures of same with benzene or methanol are preferably used as solvent.

It is advisable to add the alkyl-hypochlorite to the polyalkenamer/acid solution slowly, preferably dropwise. It can be added either in the pure state or dissolved in methylene chloride or in mixtures of same with methanol or benzol. The reaction between polyalkenamer, acid and hypochlorite is suitably conducted at a temperature comprised between —30 and +50° C., preferably between 0 and 30° C. Since the reaction is generally exothermic, it is necessary to arrange an efficient cooling system in order to keep the temperature constant.

According to the reaction temperature and to the acid employed, the reaction can be accomplished in a period of time ranging from half an hour to 24 hours after the alkyl hypochlorite addition.

On completion of the reaction, the polymer can be isolated from the reaction mixture by coagulation with methanol in excess and dried under vacuum created by a mechanical pump, preferably at a temperature between 20° and 50° C.

The reaction completeness can be checked by determining the iodine number of the purified and dried polymer.

The following examples are given to illustrate the invention, and are not intended as limiting.

EXAMPLE 1

83 g. of polypentenamer containing 85% of trans double bonds and 15% of cis double-bonds and having an intrinsic viscosity in toluene at 30° C. of 1.86 dl./g. are dissolved in 3 liters of methylene chloride. 75 ml. glacial acetic acid are added and 150 ml. tert. butyl hypochlorite are caused to drop from a funnel into the mixture under strong stirring.

The starting temperature of 20° C. is maintained throughout the reaction by removing the reaction heat by means of an ice bath. The whole is allowed to react for 24 hours, during which the yellow color of hypochlorite turns pale.

The polymer is coagulated with 6 l. of methanol, washed with fresh methanol and dried under the vacuum created by a mechanical pump at a temperature of 25° C. 190 g. of a white solid polymer are thus obtained.

This polymer has an intrinsic viscosity in toluene at 30° C. of 0.64 dl./g. Its density is 1.23 g./cc. (at 20° C.) and its glass transition temperature is 7° C. It is soluble in various solvents such as acetone, methylethylketone, methylene chloride, benzene, o-dichlorobenzene and tetrahydrofuran.

Films obtained by evaporation of solutions in methylene chloride are highly transparent and exhibit an excellent adhesiveness.

The polymer iodine number is 1.5, corresponding to 0.9% of non-converted monomeric units. From the elemental analysis of the polymer the following values have been obtained: C=51%; H=6.6%; Cl=22%. The values calculated for the formula

are: C=51.8%; H=6.8%; Cl=21.5%. The infared and the nuclear magnetic resonance analyses, together with those mentioned above, show that the polymer has essentially the structure of a poly (1-chloro-2-acetoxy-pentamer).

EXAMPLE 2

30 g. of a polypentanamer having 98% of cis double bonds, 2% of trans double bonds and an intrinsic viscosity in toluene at 30° C. of 2.2 dl./g., are dissolved in 2 liters methylene chloride. 27 ml. glacial acetic acid are added and then 54 ml. tert. butyl hypochlorite are caused to drop into the mixture from a funnel. The reaction is conducted at 20° C. under the conditions of Example 1.

After coagulation in 4 l. of methanol, the polymer is isolated according to Example 1. 69 g. of a solid white product having an intrinsic viscosity in toluene at 30° C. of 1.2 dl./g. and a glass transition temperature of 5° C. are thus obtained. Such product is soluble in several solvents, such as acetone, methylene chloride and benzene.

Films obtained by evaporation of solutions in methylene chloride are highly transparent and exhibit an excellent adhesiveness.

The polymer iodine number is 1.2, corresponding to 0.7% of non-converted monomeric units. From the elemental analysis of the polymer the following values have been obtained: C=51%; H=6.6%; Cl=22%. The values calculated for the formula

are: C=51.8%; H=6.8%; Cl=21.5%.

The infrared and the nuclear magnetic resonance analyses, together with those mentioned, show that the polymer has essentially the structure of a poly(1-chloro-2-actoxy-pentamer).

COMPARATIVE TEST NO. 1

(To be compared with Examples 1 and 2)

38 g. of polybutenamer (1,4-polybutadiene), containing 95% of cis double bonds, 5% of trans double bonds and having an intrinsic viscosity in toluene at 30° C. of 2.2 dl./g. are dissolved in 2 liters of methylene chloride. 35 ml. glacial acetic acid are added and then 70 ml. tert. butyl hypochlorite are made to drop from a funnel into the mixture under strong stirring. The reaction is conducted at 20° C. under the same conditions as in Example 1. After coagulation and isolation of the polymer according to Example 2, 70 g. of a white solid polymer having an intrinsic viscosity in toluene at 30° C. of 1.25 dl./g. and a glass transition temperature of —12° C. are obtained.

The polymer iodine number is equal to 29, corresponding to 15% of nonconverted monomeric units.

1,4-polybutadiene is a polyalkamer which differs from the polyalkamers according to this invention (see Formula V) in that in it Z is 2 instead of a number from 3 to 12.

The fact that treating 1,4-polybutadiene, either under the conditions of the present invention or under any other condition known so far, does not result in essentially complete conversion of the double bonds present in the chain, contrary to what occurs in the preparation of the substituted (co)-polyalkamers of Formula I, is evidence of the different behaviour of the polyalkamers in respect to polybutadiene and, in consequence, of the unpredictability of the present invention.

EXAMPLE 3

10 g. of polypentamer as in Example 1, are dissolved in 1000 ml. of methylene chloride. 12 ml. of formic acid and then 18.5 ml. of tert.butyl hypochlorite are added dropwise. Operating under the same conditions as in Example 1, 22 g. of a white solid polymer, having an intrinsic viscosity in toluene at 30° C. of 0.55 dl./g. and a glass transition temperature of 32° C., are obtained. It is soluble in several organic solvents, such as acetone, methylene chloride and tetrahydrofurane.

The polymer iodine number is equal to 0.5, corresponding to 0.3% of non-converted monomeric units. From the elemental analysis of the polymer the following values have been obtained: C=48.8%; H=6.5%; Cl=25%. The values calculated for the formula

are: C=48.5%; H=6.1%; Cl=24%.

Films obtained by evaporation of solutions of the polymer in methylene chloride are highly transparent and exhibit an excellent adhesiveness.

The results reported hereinbefore as well as the infrared and the nuclear magnetic resonance analyses show that the polymer has essentially the structure of a poly(1-chloro-2-formyloxy-pentamer).

EXAMPLE 4

10 g. of a polypentenamer having 99% of double cis bonds and 1% of trans double bonds and an intrinsic viscosity in toluene at 30° C. of 1.45 dl./g., is treated in a methylene chloride solution with formic acid and tert.butyl hypochlorite under the same conditions of Example 3.

22 g. of a white solid polymer having an intrinsic viscosity in toluene at 30° C. of 0.7 dl./g., are obtained. The polymer is soluble in several organic solvents, such as acetone, methylene chloride and tetrahydrofuran.

Films obtained by evaporation of solutions of the polymer in methylene chloride are highly transparent and exhibit an excellent adhesiveness.

The polymer iodine number is equal to 0.35, corresponding to 0.2% of non-converted monomeric units. From the elemental analysis of the polymer the following values have been obtained: C=48.7%; H=6.4%; Cl=24.5%. The values calculated for $$[-CHCl-CHOCOH-(CH_2-)_3]_n$$

are: C=48.5%; H=6.1%; Cl=24%. The results reported as well as the infrared and the nuclear magnetic resonance analyses show that the polymer has essentially the structure of a poly(1-chloro-2-formyloxy-pentamer).

EXAMPLE 5

10 g. of the polypentenamer as in Example 1 are dissolved in 1 liter of methylene chloride. 35 g. of p-toluenesulphonic acid dissolved in 100 ml. of a 1:1 mixture of methanol and methylene chloride are added. 20 ml. of tert.butyl hypochlorite are made to drop into the strongly stirred solution kept at 20° C.

Operating according to Example 1, 40 g. of a white solid polymer, soluble in acetone, methylene chloride, o-dichloro-benzene, tetrahydrofurane and other solvents, are isolated. The intrinsic viscosity of this polymer in o-dichlorobenzene at 30° C. is 1.2 dl./g.; its glass transition temperature is 63° C. and its density at 20° C. is 1.31 g./cm.³.

Films obtained by evaporation of solutions in methylene chloride are highly transparent and exhibit an excellent adhesiveness.

The polymer iodine number is 0.23, corresponding to 0.15% of non-converted monomeric units. From the polymer elementary analysis the following values have been obtained: C=52%; H=5.9%; Cl=14%; S=11.2%; which, calculated from the formula

are: C=52.4%; H=5.5%; Cl=13%; S=11.6%.

The infrared and the nuclear magnetic resonance analyses, together with those reported herein, show that the polymer has essentially the structure of a poly(1-chloro-2-p-toluenesulphonyloxy-pentamer).

EXAMPLE 6

Operating according to Example 5 but, instead of p-toluenesulphonic acid, employing 30 g. of non-diluted trichloroacetic acid, 37 g. of a white solid polymer, having an intrinsic viscosity in toluene at 30° C. of 0.84 dl./g., are isolated. The glass transition temperature is 56° C., and the density (at 20° C.) is 1.49 g./cc. Such polymer is soluble in acetone, methylene chloride, benzene, o-dichlorobenzene and other solvents.

Films obtained by evaporation of methylene chloride solutions are highly transparent and exhibit an excellent adhesiveness.

The polymer iodine number is 0.14, corresponding to 0.2% of non-converted monomeric units. From the elementary analysis of the polymer the following values have been obtained: C=32.3%; H=3.4%; Cl=52%, which, calculated for the formula $$[-CHCl-CHOCOCCl_3-(CH_2-)_3]_n$$

are: C=31.5%; H=3.0%; Cl=53%.

The infrared and the nuclear magnetic resonance analyses, together with those reported herein, show that the polymer has essentially the structure of a poly(1-chloro-2-trichloroacetoxy-pentamer).

EXAMPLE 7

Operating according to Example 5, but instead of 35 g. of p-toluenesulphonic acid, using 11 ml. of non-diluted trifluoroacetic acid, 24 g. of a white solid polymer, having an intrinsic viscosity in toluene at 30° C. of 0.7 dl./g. are isolated. The glass transition temperature of the polymer is 48° C. The polymer is soluble in acetone, methylene chloride and other solvents.

Films obtained by evaporation of solutions in methylene chloride are highly transparent and exhibit an excellent adhesiveness.

The polymer iodine number is 0.79, corresponding to 0.7% of the non-converted monomeric units. The elemental analysis of the polymer is as follows: C=38.2%; H=3.9%; Cl=16.8%; F=25.9%; which, calculated for the formula $[-CHCl-CHOCOCF_3-(CH_2-)_3]_n$, is: C=38.7%; H=3.7%; Cl=16.4%; F=26.3%.

The infrared and the nuclear magnetic resonance analyses and the results reported hereinabove show that the polymer has essentially the structure of a poly(1-chloro-2-trifluoroacetoxy-pentamer).

EXAMPLE 8

5 g. of polypentenamer as in Example 1 are dissolved in 1 liter of methylene chloride. After addition of 10 ml. of perfluorobutyric acid, 10 ml. of tert. butyl hypochlorite are added dropwise. Operating according to Example 1, 23 g. of a solid translucid polymer, having an intrinsic viscosity in toluene at 30° C. of 1.52 dl./g. are isolated. The glass transition temperature is 14° C. and the density (at 20° C.) is 1.52 g./cc.

This polymer is soluble in acetone, methylene chloride, benzene, o-dichlorobenzene, tetrahydrofurane and other organic solvents. It exhibits excellent hydrophobic and stain-proof properties.

The polymer iodine number is 0, which means that all of monomeric units of the polypentenamer have been transformed into units of type I. The elemental analysis of the polymer is as follows: C=35.5%; H=2.8%; Cl=10.8% F=41%; which, calculated for the formula $[-CHCl-CHOCOC_3F_7-(CH_2-)_3]_n$, is: C=34.1%; H=2.5%; Cl=11.2%; F=42.0%.

The infrared and the nuclear magnetic resonance analyses as well as the results reported hereinbefore show that the polymer has essentially the structure of a poly(1-chloro-2-perfluorobutyryloxy-pentamer).

EXAMPLE 9

Operating according to Example 8, but instead of 10 ml. of perfluorobutyric acid, using 32 g. of perfluorooctanoic acid, 37 g. of a solid translucid polymer having an intrinsic viscosity in toluene at 30° C. of 1.18 dl./g., are obtained. The glass transition temperature is −2° C.

The polymer obtained is soluble in methylene chloride, benzene and other solvents. It exhibits excellent hydrophobic and stain-proof properties.

The polymer iodine number is 0, which indicates that all the monomeric units have been converted into units of type I. The polymer elemental analysis is: C=31%; H=2.0%; Cl=7.2%; F=54.6%; which, calculated for the formula $[-CHCl-CHOCOC_7F_{15}-(CH_2-)_3]_n$, is: C=30.2%; H=1.6%; Cl=6.9%; F=55.2%.

The infrared and the nuclear magnetic resonance analyses, as well as the results reported hereinabove, prove that the polymer has essentially the structure of a poly(1-chloro-2-perfluorooctanoyloxy-pentamer).

EXAMPLE 10

5 g. of polyoctenamer containing 40% of trans double-bonds and 60% of cis double-bonds and having an intrinsic viscosity in toluene at 30° C. of 0.7 dl./g. are dissolved in 1 liter of methylene chloride. 2.25 ml. formic acid are added and then 6.25 ml. of tert. butyl hypochlorite are dripped, under strong stirring, into the mixture kept at 10° C. Coagulation occurs after 20 hours and the polymer is isolated according to Example 1.

6.5 g. of a white solid polymer are obtained. The density of the polymer (at 20° C.) is 1.15 g./cc., and its glass transition temperature is 5° C.

This polymer is soluble in methylene chloride, carbon tetrachloride, tetrahydrofurane and other solvents. Films obtained by evaporation of solutions in methylene chloride exhibit very good transparency and adhesiveness.

The polymer iodine number is 0.62, corresponding to 0.5% of non-converted monomeric units. The elemental analysis of the polymer is as follows: $C=56\%$; $H=8.0\%$; $Cl=19.5\%$; which, calculated for the formula $$[-CHCl-CHOCOH-(CH_2-)_6]_n$$

is: $C=56.8\%$; $H=7.9\%$; $Cl=18.7\%$.

The infrared and the nuclear magnetic resonance analyses and the results reported hereinbefore show that the polymer has essentially the structure of a poly(1-chloro-2-formyloxy-octamer).

EXAMPLE 11

By operating according to Example 10, but instead of 2.25 ml. formic acid, using 3.7 ml. glacial acetic acid, 9.7 g. of a white solid polymer, having an intrinsic viscosity in toluene at 30° C. of 0.73 dl./g., a density at 20° C. of 1.12 g./cc. and a glass transition temperature of $-4°$ C., are obtained.

Such polymer is soluble in methylene chloride, carbon tetrachloride, toluene, tetrahydrofurane and other solvents. Films obtained by evaporation of solutions in methylene chloride exhibit high transparency and adhesiveness.

The polymer iodine number is 0, which means that all the monomeric units have been transformed. The elemental analysis is as follows: $C=58.0\%$; $H=8.3\%$; $Cl=18\%$; which, calculated for the formula $$[-CHCl-CHOCOCH_3-(CH_2)_6]_n,$$

is: $C=58.6\%$; $H=8.3\%$; $Cl=17.4\%$.

The infrared and the nuclear magnetic resonance analyses, as well as the results reported hereinabove, show that the polymer has essentially the structure of a poly-(1-chloro-2-acetoxy-octamer).

EXAMPLE 12

Example 10 is repeated except that, instead of 2.25 ml. formic acid, 8.7 g. trichloroacetic acid are employed. 13.7 g. of a white solid polymer, having an intrinsic viscosity in toluene at 30° C. of 0.55 dl./g., a density at 20° C. of 1.35 g./cc. and a glass transition temperature of 12° C. are obtained.

This polymer is soluble in methylene chloride, carbon tetrachloride, toluene, tetrahydrofuran and other solvents. It yields films which exhibit a high transparency and an excellent adhesiveness.

The polymer iodine number is 0.30, corresponding to 0.4% of non-converted monomeric units. The elemental analysis is: $C=40\%$; $H=4.5\%$; $Cl=45\%$.; which, calculated for $[-CHCl-CHOCOCCl_3-(CH_2-)_6]_n$, is: $C=39\%$; $H=4.6\%$; $Cl=46\%$.

The infrared and the nuclear magnetic resonance analyses as well as the results indicated hereinbefore prove that the polymer has essentially the structure of a poly-(1-chloro-2-trichloroacetoxy-octamer).

EXAMPLE 13

Operating according to Example 10, but instead of 2.25 ml. formic acid, using 8 ml. perfluorobutyric acid, 14 g. of a white solid polymer, having an intrinsic viscosity in toluene at 30° C. of 0.35% dl./g., a density (at 20° C.) of 1.40 g./cc. and a glass transition temperature of $-5°$ C., are obtained.

The polymer is soluble in acetone, methylene chloride, carbon tetrachloride, toluene, o-dichlorobenzene, tetrahydrofurane and other solvents. It exhibits excellent water-repellent and stain-proof properties.

The polymer iodine number is 0.20, corresponding to 0.35% of non-converted monomeric units. The elemental analysis is: $C=41\%$; $H=4.1\%$; $Cl=10.4\%$; $F=36.5\%$; which, calculated for $$[-CHCl-CHOCOC_3F_7-(CH_2)_6]_n,$$

is: $C=40\%$; $H=3.9\%$; $Cl=9.9\%$; $F=37\%$.

The infrared and the nuclear magnetic resonance analyses, as well as the results reported hereinbefore, prove that the polymer has essentially the structure of a poly(1-chloro-2-perfluorobutyryloxy-octamer).

EXAMPLE 14

5 g. of polydodecenamer having 87% of trans double bonds, 13% of cis double bonds and an intrinsic viscosity in toluene at 30° C. of 1.23 dl./g., are dissolved in 1.2 liter of methylene chloride. 2 ml. glacial acetic acid are added and then 2 ml. tert. butyl hypochlorite are admixed dropwise to the mixture which is kept under strong stirring and heated to 40° C. The reaction is completed after one hour. The polymer is isolated according to Example 1.

7.5 g. of a white solid polymer having an intrinsic viscosity in toluene at 30° C. of 0.95 dl./g., a density at 20° C. of 1.05 g./cc. and a glass transition temperature of $-35°$ C., are obtained. The polymer is soluble in methylene chloride, benzene and o-dichlorobenzene and permits to obtain films exhibiting a very good transparency and a high adhesiveness.

The polymer iodine number is 0.28, corresponding to 0.3% of non-converted monomeric units. The elementary analysis is: $C=65\%$; $H=10.0\%$; $Cl=14.0\%$; which, calculated for $[-CHCl-CHOCOCH_3-(CH_2)_{10}]_n$, is: $C=64.5\%$; $H=9.6\%$; $Cl=13.6\%$.

The infrared and the nuclear magnetic resonance analyses as well as the results reported hereinbefore show that the polymer has essentially the structure of a poly(1-chloro-2-acetoxy-dodecamer).

EXAMPLE 15

By operating according to Example 14, but, instead of 2 ml. acetic acid, employing 5 g. trichloroacetic acid, 10 g. of a white semisolid polymer having an intrinsic viscosity in toluene at 30° C. of 1.24 dl./g., a density (at 20° C.) of 1.23 g./cc. and a glass transition temperature of $-13°$ C., are obtained. This polymer is soluble in methylene chloride, carbon tetrachloride, benzene, o-dichlorobenzene, tetrahydrofurane and other solvents; it supplies films exhibiting a very good transparency and a high adhesiveness.

The polymer iodine number is lower than 0.1, which indicates that less than 0.2% of the monomeric units have not been converted. The elemental analysis is: $C=47\%$; $H=6.3\%$; $Cl=38\%$; which, calculated for $[-CHCl-CHOCOCCl_3-(CH_2)_{10}-]_n$, is $C=46.2\%$; $H=6.1\%$; $Cl=39\%$.

The infrared and the nuclear magnetic resonance analyses and the results reported hereinbefore show that the polymer was essentially the structure of a poly(1-chloro-2-trichloroacetoxy-dodecamer).

EXAMPLE 16

Operating according to Example 14, but using, instead of 2 ml. acetic acid, 4.0 ml. perfluorobutyric acid, 8.7 g. of a white elastomeric polymer, having an intrinsic viscosity in toluene at 30° C. of 0.8 dl./g., a density (at 20° C.) of 1.27 g./cc. and a glass transition temperature of −31° C., are obtained. The polymer is soluble in methylene chloride, carbon tetrachloride, benzene, o-dichlorobenzene, tetrahydrofurane and other solvents; it yields films exhibiting high hydrophobic and stainproof properties.

The polymer iodine number is 0.28, corresponding to 0.4% of non-converted monomeric units. The elemental analysis is: C=42%; H=4.9%; Cl=9%; F=31.7%; which, calculated for

[—CHCl—CHOCOC$_3$F$_7$—(CH$_2$—)$_{10}$]$_n$ is: C=41.3%; H=5.3%; Cl=8.6%; F=32.2%.

The infrared and the nuclear magnetic resonance analyses, as well as the results reported hereinbefore, show that the polymer has essentially the structure of a poly-(1-chloro-2-perfluorobutyryloxy-dodecamer).

EXAMPLE 17

10 g. of poly-3-methyloctenamer, consisting essentially of monomeric units of the type $$\left[-CH=CH-\underset{\underset{CH_3}{|}}{CH}-(CH_2-)_5\right]$$

wherein 65% of the double bonds are of the trans-type and 35% of the cis-type, and having an intrinsic viscosity in toluene at 30° C. of 1.1 dl./g., are dissolved in 2 liters of methylene chloride. 6 g. of glacial acetic acid are added and after cooling to −10° C., 11 ml. of tert. butyl hypochlorite are caused to drip into the mixture under strong agitation. 20 hours after addition of the hypochlorite is completed, coagulation is carried out with methanol and the polymer is isolated according to Example 1. 17 g. of a white elastomer polymer having an intrinsic viscosity in toluene at 30° C. of 0.7 dl./g., a density (at 20° C.) of 1.08 g./cc. and a glass transition temperature of 20° C., are obtained. The polymer is soluble in methylene chloride, benzene, tetrahydrofurane and other solvents and yields films exhibiting good transparency and adhesiveness.

The polymer iodine number is 1.2, corresponding to about 1% of non-converted monomeric units. The elemental analysis is: C=60.1%; H=8.9%; Cl=15.8%; which, calculated for

[—CHCl—CHOCOCH$_3$—CHCH$_3$—(CH$_2$—)$_5$]$_n$ is: C=60.6%; H=8.7%; Cl=16.2%.

The infrared and the nuclear magnetic resonance analyses, as well as the results reported hereinabove, prove that the polymer has essentially the structure of a poly-(1-chloro-2-acetoxymethyloctamer).

EXAMPLE 18

10 g. of a copolymer of cyclopentene with cyclooctene, having essentially the structure of a poly(pentenamer)-co(octenamer) with both types of monomeric units distributed at random, consisting of 67 mol percent of pentenamer units and of 33 mol percent of octenamer units, wherein the double bonds are for 80% of the trans-type and for 20% of the cis-type, and having an intrinsic viscosity in toluene at 30° C. of 1.2 dl./g., are dissolved in 1.5 liter of methylene chloride. After addition of 22 g. trichloroacetic acid, the whole is heated to 10° C. and, under strong stirring, 17 ml. of tert. butyl hypochlorite are admixed dropwise. The reaction is carried on for 8 hours after the addition of hypochlorite.

The polymer is isolated as described in Example 1. 34 g. of a white solid polymer having an intrinsic viscosity in toluene at 30° C. of 0.85 dl./g. and a glass transition temperature of 16° C., are obtained. The polymer is soluble in methylene chloride, benzene, toluene and other solvents and yields films exhibiting high transparency and a very good adhesiveness. The polymer iodine number is 0.25, corresponding to 0.3% of non-converted monomeric units. The elemental analysis is as follows: C=33.8%; H=3.8%; Cl=51.2%; which, calculated for

[—CHCl—CHOCOCCl$_3$—(CH$_2$—)$_3$]$_{67}$—
[—CHCl—CHOCOCCl$_3$—(CH$_2$—)$_6$]$_{33}$ is: C=34.3%; H=3.6%; Cl=50.7%.

The infrared and the nuclear magnetic resonance analyses, as well as the results reported hereinabove, prove that the polymer has essentially the structure of a poly-(1-chloro - 2 - trichloroacetoxy-pentamer)-co-(1-chloro-2-trichloroacetoxy-octamer).

COMPARATIVE TEST NO. 2

Example 3 is repeated, but instead of using 12 ml. formic acid (having a dissociation constant in water at 25° C. of 1.76×10$^{-4}$), 13 ml. of n-butyric acid (having a dissociation constant in water at 25° C. of 1.51×10$^{-5}$) are employed. Operating according to Example 1, 25 g. of a white solid polymer, having an intrinsic viscosity in toluene at 30° C. of 1.83 dl./g., a glass transition temperature of −28° C. and a density (at 20° C.) of 1.10 g./cc., are isolated. This polymer is soluble in methylene chloride, benzene and other solvents.

The polymer iodine number is 24.16, which indicates that only 88% of the monomeric units have been converted, while 12% of said units remained unchanged.

This comparison test proves that the process according to the present invention is restrictive as regards the acids to be employed, as the acids having a dissociation constant in water at 25° C. of at least 1.65×10$^{-5}$ permit to attain an essentially complete conversion of the products according to Formula I. This is also a further proof of the selectivity and unpredictability of the present invention.

EXAMPLE 19

1 g. of the polymer having the structure of a poly(1-chloro-2-trichloroacetoxy-pentenamer), prepared according to Example 6, is dissolved in 20 cc. methylene chloride. The solution is poured on a chromium plated iron surface. The methylene chloride is thoroughly evaporated, so that a thin polymer film (about 0.04 mm. thick) having a width of 1 inch, is formed.

The adhesion of this film to the substrate is determined by measuring with a dynamometer the stress required to strip it from its substrate at a torsion speed of 50 mm./min. The stress required in the case of this polymer is 1.6 kg./inch.

The same measurement has been made for comparative purposes on another material used in practice as film-forming agent for paints (as illustrated hereinafter in Comparative Test No. 3).

COMPARATIVE TEST NO. 3

1 g. of a butyl acrylate/methylmethacrylate (60/40) copolymer having an intrinsic viscosity in toluene at 30° C. of about 2 dl./g., industrially used as film-forming agent for paints, is dissolved in 20 ml. methylene chloride. The solution is poured on a chromium plated iron surface and the methylene chloride is thoroughly evaporated so that a thin polymer film (about 0.04 mm. thick) having a width of 1 inch is formed.

The adhesiveness of said film to its support is measured as in Example 19.

The stress required in the case of the polymer used in this comparative test is 0.5–0.6 kg./inch. The adhesiveness of said polymer is, therefore, considerably lower than that of the polymer of Example 19, which exhibits particularly good properties as film-forming agent for paints.

EXAMPLE 20

The wettability of the polymers of the present invention is measured according to the equilibrium contact angle method with drops of a series of linear paraffins (a method described by W. A. Zisman in "Contact Angle Wettability and Adhesion," Advance in Chemistry Series No. 43, American Chemical Society, Washington, D.C., 1964, pp. 1–51).

The polymer having the structure of a poly(1-chloro-2-perfluorobutyryloxy-pentamer) and prepared according to Example 8 of the present invention has a $\gamma_c$ value=22 dynes/cm. (at 20° C.), wherein $\gamma_c$ is the critical surface tension.

The polymer, prepared according to Example 9 and having the structure of a poly(1-chloro-2-perfluorooctanoyloxy-pentamer), has a $\gamma_c$ value=21 dynes/cm. (at 20° C.).

The values of some commercial polymers are as follows (at 20° C.):

high density polyethylene: $\gamma_c$=31 dynes/cm.
polyvinyl chloride: $\gamma_c$=39 dynes/cm.
polytrifluoride-monochloroethylene: $\gamma_c$=31 dynes/cm.
polytetrafluoroethylene: $\gamma_c$=18.5 dynes/cm.

Since the wettability of a polymer is lower the lower the value of $\gamma_c$, it follows that the polymers obtained according to present Examples 8 and 9 are excellent as regards the non-wettability property and can be employed in practice, therefore, as water-repellent, waterproofing and stain-proofing agents for textiles.

The fact that a polymer having a very high fluorine content, such as polytrifluoro-monochloroethylene, has a $\gamma_c$ value much higher than that of the polymers according to this invention, proves that the high fluorine content of a polymer is not sufficient, in and of itself, to ensure a low equilibrium contact angle and, consequently, good water-repellent properties and that, therefore, such effect could not have been expected for the present polymers.

As will be evident, many changes in details may be made in practicing this invention without departing from its spirit. Therefore, we intend to include in the scope of the appended claims all modifications which will be obvious to those skilled in the art from the description and working examples given herein.

What we claim is:

1. Substituted (co)polyalkamers having a high molecular weight and the macromolecules of which consist essentially of the same or different repeating units having the formula

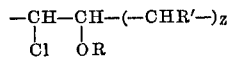

wherein R is the radical containing 1 to 18 carbon atoms of an organic monobasic acid having a dissociation constant in water at 25° C. of at least $1.65 \times 10^{-5}$, the R' groups are hydrogen atoms or a part of them are methyl groups, Z is a whole number from 3 to 10, and the ratio between the methylene groups and the sum of the CHCl and CHOR groups is comprised between 1.5:1 anod 5:1; said (co)polyalkamers having an intrinsic viscosity, measured in toluene or in o-dichlorobenzene at 30° C., comprised between 0.3 and 5 dl./g. and being soluble in methylene chloride.

2. Substituted (co)polyalkamers according to claim 1, wherein R is an acyl radical.

3. Substituted (co)polyalkamers according to claim 1, wherein R is a chlorine-substituted acyl radical.

4. Substituted (co)polyalkamers according to claim 1, wherein R is a fluorine-substituted acyl radical.

5. Strongly adherent film forming products for paints consisting essentially of the (co)polyalkamers according to claim 1.

6. Stain-proofing and waterproofing agents consisting essentially of (co)polyalkamers according to claim 1.

7. A process for preparing substituted (co)polyalkamers, having a high molecular weight and consisting essentially of same or different repeating units having the formula

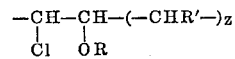

wherein R is the acid radical containing 1 to 18 carbon atoms of a monobasic organic acid having a dissociation constant in water at 25° C. of at least $1.65 \times 10^{-5}$, the R' groups are hydrogen atoms or a part of them are methyl groups, Z is a whole number from 3 to 10, and the ratio between the methylene groups and the sum of the CHCl and CHOR groups is comprised between 1.5:1 and 5:1, characterized in that a polyalkenamer consisting of the hame or different units having the structure —CH=CH—(—CHR'—)$_z$, wherein R' and Z have the meaning defined hereinabove and dissolved in methylene chloride alone or in mixtures with methanol or benzol, is reacted with, per mole of polyalkenamer (a) from 1 to 2 moles of a monobasic organic acid containing 1 to 18 carbon atoms and having a dissociation constant in water at 25° C. of at least $1.65 \times 10^{-5}$, and with (b) from 1.0 to 1.3 moles of an alkyl hypochlorite.

References Cited
UNITED STATES PATENTS
3,293,323  12/1966  Gardner _____ 260—846

JOSEPH L. SCHOFER, Primary Examiner
R. S. BENJAMIN, Assistant Examiner

U.S. Cl. X.R.
260—80.78, 87.1, 88.2 S, R, 93.1, 94.7 A, HA; 156—333

UNITED STATES PATENT OFFICE
CERTIFICATE OF CORRECTION

Patent No. 3,772,260  Dated November 13, 1973

Inventor(s) Gino Dall'Asta et al.

It is certified that error appears in the above-identified patent and that said Letters Patent are hereby corrected as shown below:

Col. 2, lines 44-45, "alkylpochlorite" should read

-- alkylhypochlorite --.

Col. 2, line 59, should read -- (IV) - CH = CH - ( -CH$_2$-)$_2$ --.

Col. 3, line 51, "monocholropropionic" should read

-- monochloro-propionic- --.

Col. 3, line 56, "salicyclic acid" should read -- salicylic acid --.

Col. 4, line 47, "poly(1-chloro-2-formyloxy-pentamer)" should read -- poly (1-chloro-2-formyloxy-methyl-dodecamer --.

line 75, "chloro-2-trifluororo-acetoxy-octamer)" should read -- chloro-2-trifluoro-acetoxy-octamer); --

Col. 5, line 23, -- minus sign -- should be inserted before

"13°C".

Col. 7, line 57, "infared" should read -- infrared -- line 64, "polypentanamer" should read -- polypentenamer-

Col. 13, line 33, "elastomer" should read -- elastomeric --

UNITED STATES PATENT OFFICE
CERTIFICATE OF CORRECTION

Patent No. 3,772,260  Dated November 13, 1973

Inventor(s) Gino Dall'Asta et al.

It is certified that error appears in the above-identified patent and that said Letters Patent are hereby corrected as shown below:

Col. 15, last line "anod" should read -- and --.

Col. 16, line 31, "hame" should read -- same --.

Signed and sealed this 20th day of August 1974.

(SEAL)
Attest:

McCOY M. GIBSON, JR.          C. MARSHALL DANN
Attesting Officer              Commissioner of Patents